US011362866B2

(12) United States Patent
Kons et al.

(10) Patent No.: US 11,362,866 B2
(45) Date of Patent: *Jun. 14, 2022

(54) ITERATIVE CHANNEL ESTIMATION AND EQUALIZATION WITH SUPERIMPOSED REFERENCE SIGNALS

(71) Applicant: Cohere Technologies, Inc., Santa Clara, CA (US)

(72) Inventors: Shachar Kons, Santa Clara, CA (US); Ronny Hadani, Santa Clara, CA (US); Michail Tsatsanis, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/188,845

(22) Filed: Mar. 1, 2021

(65) Prior Publication Data

US 2021/0194732 A1 Jun. 24, 2021

Related U.S. Application Data

(63) Continuation of application No. 16/303,590, filed as application No. PCT/US2017/033632 on May 19, 2017, now Pat. No. 10,938,602.

(Continued)

(51) Int. Cl.
*H03H 7/30* (2006.01)
*H03H 7/40* (2006.01)
(Continued)

(52) U.S. Cl.
CPC ........ *H04L 25/0204* (2013.01); *H04L 5/0048* (2013.01); *H04L 25/0236* (2013.01); *H04L 27/01* (2013.01); *H04L 27/34* (2013.01)

(58) Field of Classification Search
CPC .............. H04L 25/0204; H04L 5/0048; H04L 25/0236; H04L 27/01; H04L 27/34;
(Continued)

(56) References Cited

U.S. PATENT DOCUMENTS

| 4,754,493 A | 6/1988 | Coates |
| 5,083,135 A | 1/1992 | Nagy et al. |

(Continued)

FOREIGN PATENT DOCUMENTS

| CN | 1235720 A | 11/1999 |
| CN | 101682316 A | 3/2010 |

(Continued)

OTHER PUBLICATIONS

Office Action for U.S. Appl. No. 13/117,119, dated Aug. 5, 2013, 5 pages.

(Continued)

*Primary Examiner* — Phuong Phu
(74) *Attorney, Agent, or Firm* — Perkins Coie LLP

(57) ABSTRACT

In a transmitter apparatus, a known reference signal is superimposed on top of a data signal that is typically not known a priori to a receiver and the combined signal is transmitted. At a receiver, an iterative channel estimation and equalization technique is used to recover the reference signal and the unknown data signal. In the initial iteration, the known reference signal is recovered by treating the data signal as noise. Subsequent iterations are used to improve estimation of received reference signal and the unknown data signal.

20 Claims, 9 Drawing Sheets

Related U.S. Application Data

(60) Provisional application No. 62/339,476, filed on May 20, 2016.

(51) Int. Cl.

| | | |
|---|---|---|
| *H03K 5/159* | (2006.01) | |
| *H04L 25/02* | (2006.01) | |
| *H04L 5/00* | (2006.01) | |
| *H04L 27/01* | (2006.01) | |
| *H04L 27/34* | (2006.01) | |

(58) Field of Classification Search
CPC .............. H04L 25/023; H04L 25/022; H04L 25/03292; H04L 25/03171; H04L 25/03006; H04L 25/03178; H04L 1/0071; H04B 1/62
USPC .................. 375/229–233, 346, 348, 350
See application file for complete search history.

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 10,938,602 B2 * | 3/2021 | Kons ............... H04L 5/0048 |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Riu et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121393 A1* | 5/2013 | Fang ............... H04L 25/023 375/227 |
| 2013/0121497 A1 | 5/2013 | Smaragdis et al. |

(56) References Cited

U.S. PATENT DOCUMENTS

| | | |
|---|---|---|
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib et al. |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |

FOREIGN PATENT DOCUMENTS

| | | |
|---|---|---|
| CN | 101939935 A | 1/2011 |
| EP | 1432168 A1 | 6/2004 |
| JP | 2011127910 A | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

Notice of Allowance for U.S. Appl. No. 13/117,119, dated Feb. 28, 2014, 13 pages.
Banelli, P. et al., "Modulation Formats and Waveforms for 5G Networks: Who Will Be the Heir of OFDM?," IEEE Signal Processing Magazine, vol. 81, pp. 80-93, Nov. 2014.
El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.
Rusek, F. et al., "Scaling Up MIMO, Opportunities and Challenges with Very Large Arrays," IEEE Signal Processing Magazine, pp. 40-60 (2013).
Vodafone, "Cellular Internet of Things: Architectural Aspects," RP-150869, 3GPP RAN#68, Malmo, Sweden (Jun. 9, 2015), 19 pages.
Supplementary European Search Report for European Application No. 11787483.4, dated Sep. 9, 2014, 6 pages.
International Search Report and Written Opinion for International Application No. PCT/US2011/038302, dated Nov. 15, 2011, 8 pages.
International Preliminary Reporton Patentability for International Application No. PCT/US2011/038302, dated Dec. 4, 2012, 7 pages.
Office Action for U.S. Appl. No. 13/117,124, dated Feb. 22, 2013, 7 pages.
Notice of Allowance for U.S. Appl. No. 13/117,124, dated Aug. 8, 2013, 10 pages.
Office Action for U.S. Appl. No. 14/605,957, dated Jun. 22, 2017, 6 pages.
Supplementary European Search Report for European Application No. 13809004.8, dated Apr. 14, 2016, 8 pages.
Communication Pursuant to Article 94(3) EPC for European Application No. 13809004.8, dated Feb. 17, 2017, 5 pages.
Notice of Allowance for U.S. Appl. No. 13/927,087, dated Feb. 25, 2015, 9 pages.
Office Action for U.S. Appl. No. 13/927,087, dated Nov. 12, 2014, 14 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
International Search Report and Written Opinion for International Application No. PCT/US2013/047723, dated Oct. 29, 2013, 17 pages.
International Preliminary Reporton Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.

(56) References Cited

OTHER PUBLICATIONS

Examination Report No. 1 for Australian Application No. 2013239970, dated Dec. 8, 2015, 3 pages.
"AT&T Annual Report 2014," Opening Our Network [Online]. Retrieved from the Internet Sep. 22, 2016. <URL: http://www.att.com/Investor/ATT_Annual/2014/att_introduces_new_concepts_for_telecom_network.html>, 5 pages.
Catt, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on Mar. 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
International Search Report and Written Opinion for International Application No. PCT/US2017/025797, dated Jun. 21, 2017, 6 pages.
International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.

\* cited by examiner

ITERATIVE CHANNEL ESTIMATION AND EQUALIZATION WITH SUPERIMPOSED REFERENCE SIGNALS

CROSS REFERENCE TO RELATED APPLICATIONS

This patent document is a continuation of U.S. application Ser. No. 16/303,590 entitled "ITERATIVE CHANNEL ESTIMATION AND EQUALIZATION WITH SUPERIMPOSED REFERENCE SIGNALS" filed Nov. 20, 2018, which is a 371 National Phase Application of PCT Application No. PCT/US2017/033632 entitled "ITERATIVE CHANNEL ESTIMATION AND EQUALIZATION WITH SUPERIMPOSED REFERENCE SIGNALS" filed on May 19, 2017 which claims priorities to and benefits of U.S. Provisional Application No. 62/339,476 entitled "ITERATIVE CHANNEL ESTIMATION AND EQUALIZATION WITH SUPERIMPOSED REFERENCE SIGNALS" filed on May 20, 2016. The entire contents of the aforementioned patent applications are incorporated by reference as part of the disclosure of this patent document.

TECHNICAL FIELD

The present document relates to wireless communication, and more particularly, transmission and reception of reference signals in single-input-single-output (SISO) and multiple-input-multiple-output (MIMO) systems.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses techniques for reduced overhead transmission and reception of reference signals that may be used for channel estimation.

In one example aspect, a transmitter-side technique for generating and transmitting a reference signal and information bits by superimposing on top of each other. The technique includes receiving information bits for transmission, performing encoding operation on the information bits to generate encoded information bits, mapping the encoded information bits to symbols of a constellation to generate a sequence of symbols, generating an output signal for transmission by either (a) first superimposing a reference signal on the sequence of symbols to generate a composite signal and by modulating the composite signal into the output signal, or (b) first modulating the sequence of symbols to produce a modulated signal and by superimposing the reference signal over the modulated signal to generate the output signal. The superimposing the reference signal refrains from increasing transmission bandwidth required for transmission of the output signal.

In another example aspect, a receiver-side technique is disclosed. The technique includes (A) generating a channel estimate using the known reference signal and received and demodulated signal, (B) using the channel estimate to equalize the channel, thereby producing an estimation of the data symbols and the superimposed reference signal, (C) removing the known reference signal from the estimation obtained in Step (B), (D) decoding data output after removing the known reference signal in Step (C) thereby generating estimation on the unknown data signal and extrinsic estimations on the encoded symbols, (E) applying the channel estimate on the estimation of the unknown data signal and subtracting resulting signal from the received samples to generate a revised estimate of received reference signal, (F) generating a new channel estimation using the revised estimate of the received reference signal, and (G) iterating Step (B) to step (G) until an exit criteria is met.

In another example aspect, a receiver side technique is disclosed. The technique includes (A) generating a channel estimate using the known reference signal and by demodulating the signal, (B) applying the channel estimate obtained in Step (A) to the known reference signal and subtracting the result from the received signal, (C) using the channel estimate to equalize the signal obtained in Step (B), thereby producing an estimation of the data symbols, (D) decoding data output thereby generating estimation of the unknown data signal and extrinsic estimations of encoded symbols in the signal, (E) applying the channel estimate to the estimation of the unknown data signal and subtracting resulting signal from the received signal to generate a revised estimate of the received reference signal, (F) generating a new channel estimation using the revised estimate of the received reference signal, and (G) iterating Step (B) to step (G) until an exit criteria is met.

In another example aspect, a receiver-side technique is disclosed. The technique includes (A) generating a channel estimate using the known reference signal and by demodulating the signal; (B) using the channel estimate to equalize the channel, and subtracting the known reference signal therefrom; (C) producing an estimation of the data symbols from signal resulting from subtracting in in Step (B); (D) decoding data output from the estimation of the data symbols obtained in step (C), thereby generating estimation on the unknown data signal and extrinsic estimations of encoded symbols in the signal; (E) applying the channel estimate on the estimation of the unknown data signal and subtracting resulting signal from the received samples to generate a revised estimate of the received reference signal; (F) generating a new channel estimation using the revised estimate of the received reference signal; and (G) iterating Step (B) to step (G) until an exit criteria is met.

In another example aspect, a receiver-side technique is disclosed. The technique includes (A) generating a channel estimate using the known reference signal and received demodulated signal, (B) applying the channel estimate on the known reference signal and removing it from the received demodulated signal, (C) using the channel estimate to equalize the channel, thereby producing an estimation of the data symbols, (D) decoding data output thereby generating estimation on the unknown data signal and extrinsic estimations on the encoded symbols, (E) applying the channel estimate on the estimation of the unknown data signal and subtracting resulting signal from the received samples to generate a revised estimate of received reference signal, (F) generating a new channel estimation using the revised estimate of the received reference signal, and (G) iterating Step (B) to step (G) until an exit criteria is met.

These, and other, features are described in this document.

BRIEF DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document to improve readability of the description and do not in any way limit the discussion to the respective sections only.

Many communication systems use reference signals (sometimes also called pilot symbols), which are pre-determined signals that are transmitted over the channel and used in the receiver to improve the quality of reception by allowing estimation of unknown parameters such as channel response, frequency offset, etc. These signals are typically separated from the information data signals and require additional resources such as bandwidth or throughput.

This document addresses the problem of training signal (or pilot signal) overhead that is required in wireless communication systems in order for the receiver to estimate the channel. This overhead increases significantly for fast varying channels found in cases of high mobility. Further, this overhead increases significantly with large numbers of transmit and receive antennas in MIMO (Multiple-Input-Multiple-Output) systems, since each information stream transmitted over the MIMO system typically requires a separate set of pilot signals. Due to these difficulties in channel estimation, current systems and prior art limit MIMO transmission to low mobility use cases.

Using the techniques described in the present document, some embodiments may implement a transmission scheme in which the reference signals are super-imposed on the information data signals and therefore do not require any additional bandwidth or throughput. The present document also provides, among other things, a method for channel estimation and equalization using pilots that are overlaid on the data on the same time and bandwidth resources eliminating the need for pilot bandwidth overhead.

Some implementations of the disclosed technique may be incorporated into a system that includes a transmitter, an unknown channel and a receiver. One example method disclosed herein provides ways for joint channel estimation and equalization without any loss of bandwidth or throughput.

Figure 1:
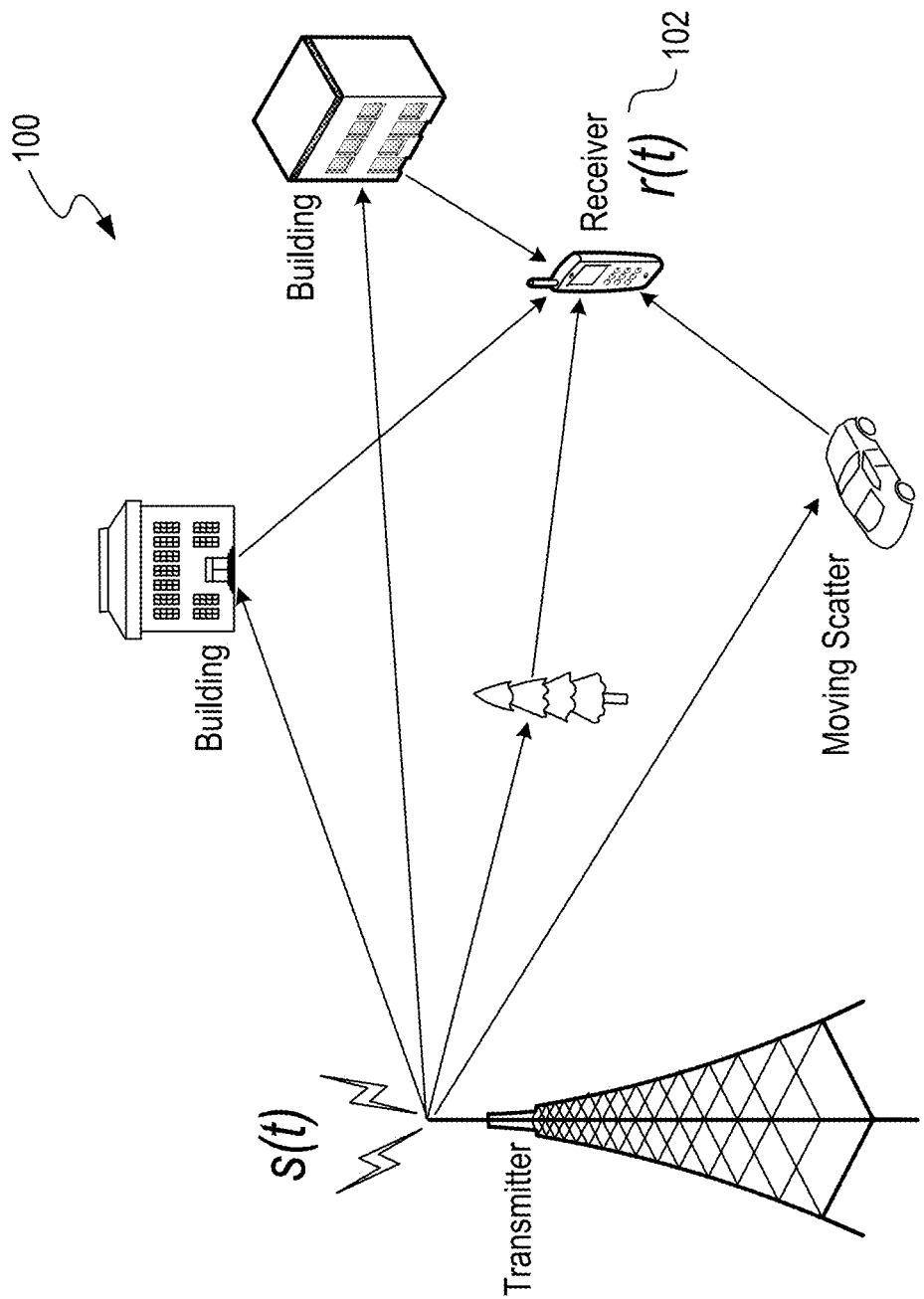
FIG. 1 shows an example communication network.

FIG. 1 shows an example communication network 100 in which the disclosed technologies can be implemented. The network 100 may include a base station transmitter that transmits wireless signals s(t) (downlink signals) to one or more receivers 102, the received signal being denoted as r(t), which may be located in a variety of locations, including inside or outside a building and in a moving vehicle. The receivers may transmit uplink transmissions to the base station, typically located near the wireless transmitter. The technology described herein may be implemented at a receiver 102.

Example Transmitter Embodiments

Figure 2:
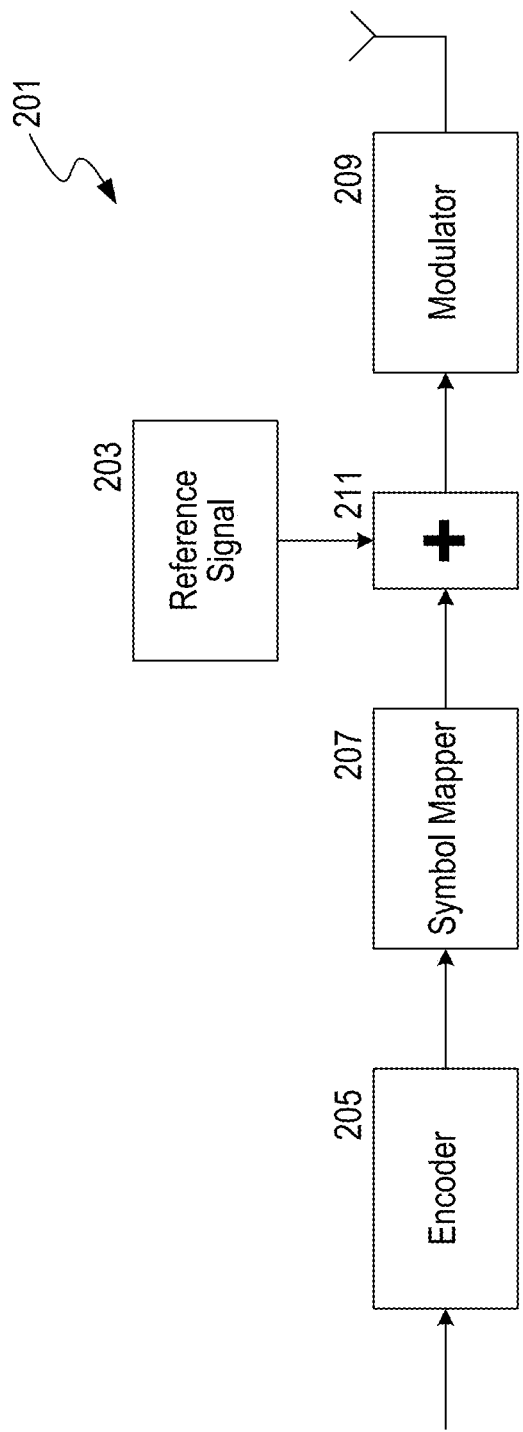
FIG. 2 shows an example of a transmitter embodiment.

The transmitter encodes information data and maps the encoded bits to data symbols. FIG. 2 shows an example transmitter embodiment 201 in which known reference signal 203 is super-imposed on the data signal before modulation. The data is received by an encoder 205 that performs data encoding and produces encoded data output. The encoded data output is converted into symbols by a symbol mapper 207. The super-imposition operation is performed by the module 211. The superimposed signal is then modulated using a modulator 209 and the output is upconverted and transmitted over the transmission medium using one or more antennas. By super-imposing the reference signal on the data signal, there is no loss of bandwidth of throughput comparing to only transmitting the data symbols.

Figure 3:
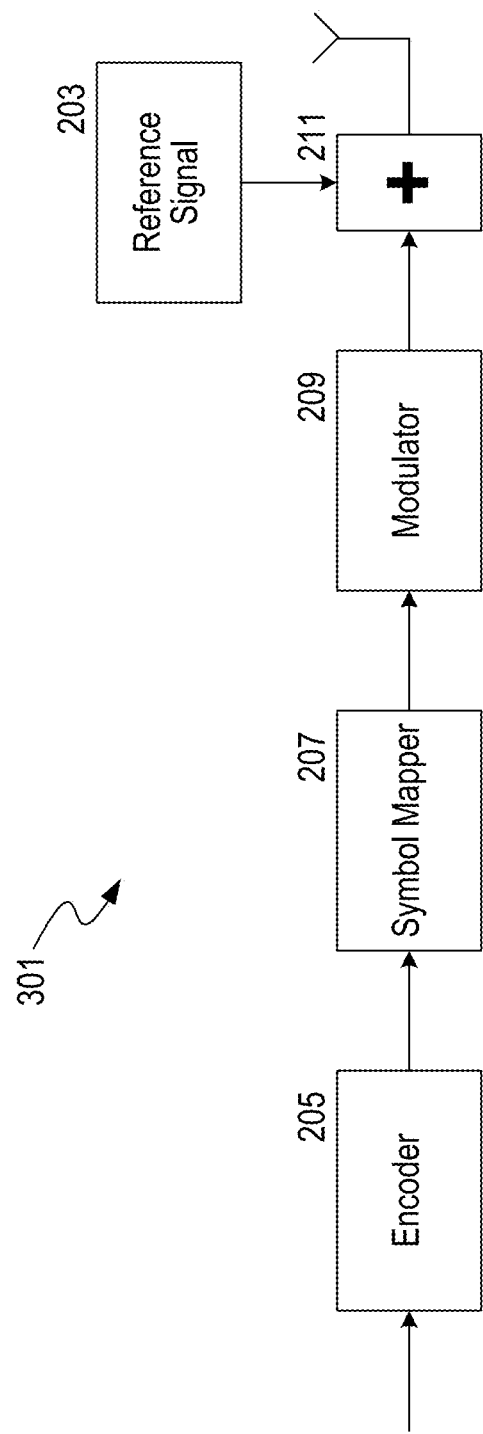
FIG. 3 shows another example of a transmitter embodiment.

FIG. 3 shows an example transmitter embodiment 301 in which a known reference signal is super-imposed on the data signal after modulation.

Examples of Transmission Channel

The signal is transmitted over an unknown channel, such as a fading wireless channel. Various mathematical models are known to one of skill in the art.

Example Receiver Embodiments and Reception Methods

Figure 4:
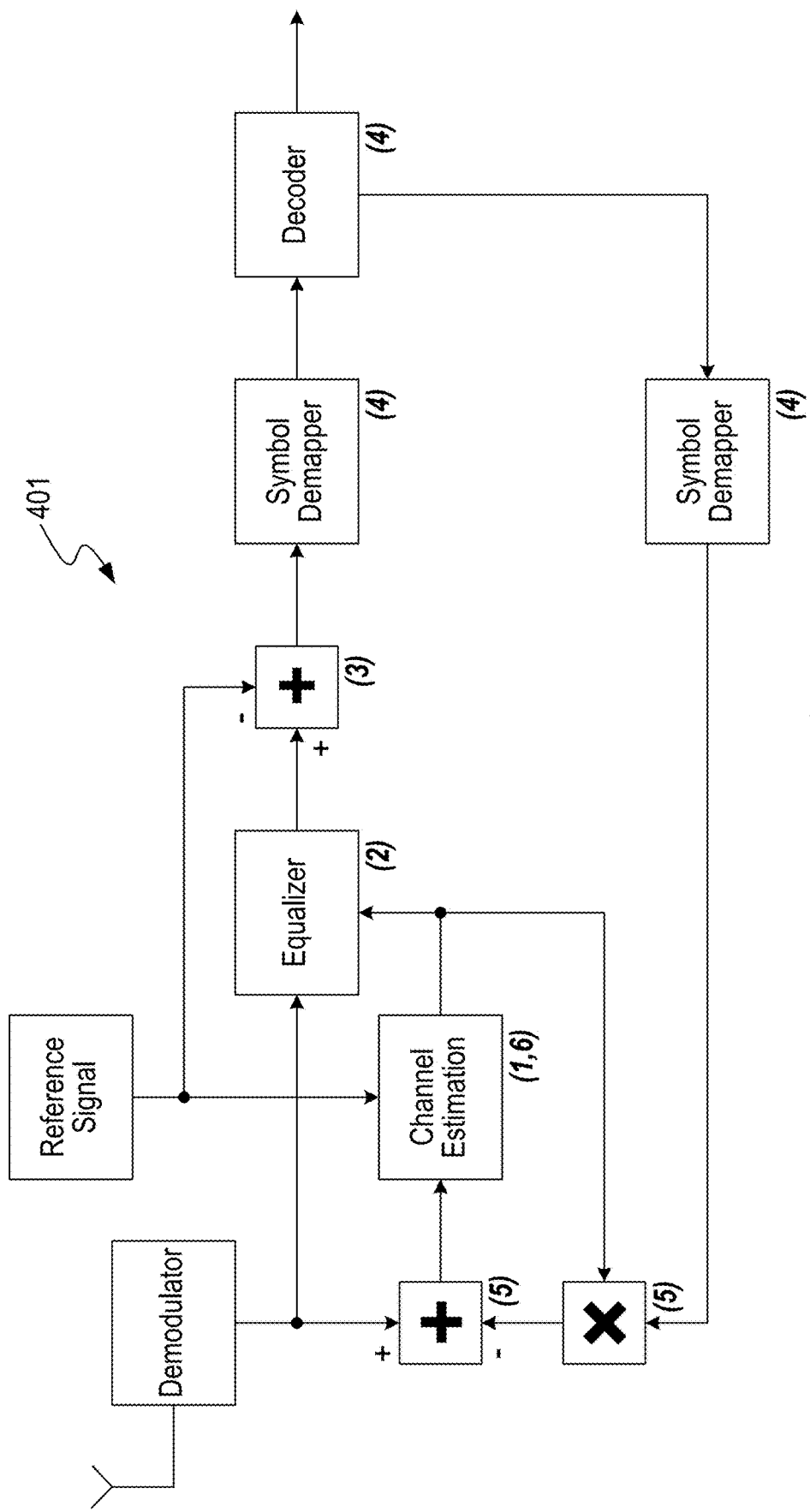
FIG. 4 shows an example of a receiver embodiment.

FIG. 4 shows an example receiver apparatus 401. The receiver 401 jointly estimates the channel, equalizes it and decodes the data symbols to generate estimates of the information data. The receiver 401 includes one or more antennas that receive signal over the wireless channel and demodulate the received signal to generate a symbol stream. The symbol stream is fed into a channel equalizer that uses results from channel estimation to equalize the channel and generate channel equalized signal. The known reference signal is locally generated and is coupled to a subtracter that removes the reference signal from the channel equalized signal. The output of the subtraction is fed into a symbol demapper. The output of the demapper is input to a decoder that decodes data bits. The decoder also provides its output to a symbol mapper, whose output is fed back to the channel estimation process, as further described below.

The receiver 401 iteratively performs the following operations. The numbering of operations matches the numbering provided in FIG. 4 example.

(1) Generate an initial estimation of the channel using the known reference signal and the received demodulated signal. In this step, the data symbols which are super-imposed on the reference signal are treated as noise.

(2) Use the channel estimation from the previous step to equalize the channel. The result is an estimation of the data symbols and the reference signal.

(3) Remove the known reference signal from the equalized data of step 2.

(4) Decode the data output of step 3. Generate estimation on the source information data and extrinsic estimations on the encoded symbols.

(5) Apply the channel estimation (from steps 1 or 6) on the estimated encoded symbols (step 4) and subtract the result from the received samples, to generate a new and cleaner received reference signal.

(6) Generate a new channel estimation using the reference signal of step 5.

Go to step 2. The iteration is terminated when an exit criterion is met. In some embodiments, the receiver 401 may also include an arrangement in which the output of symbol mapper is connected to the channel estimation module and may be used to improve channel estimates at time-frequency locations where no reference signals are sent.

Figure 5:
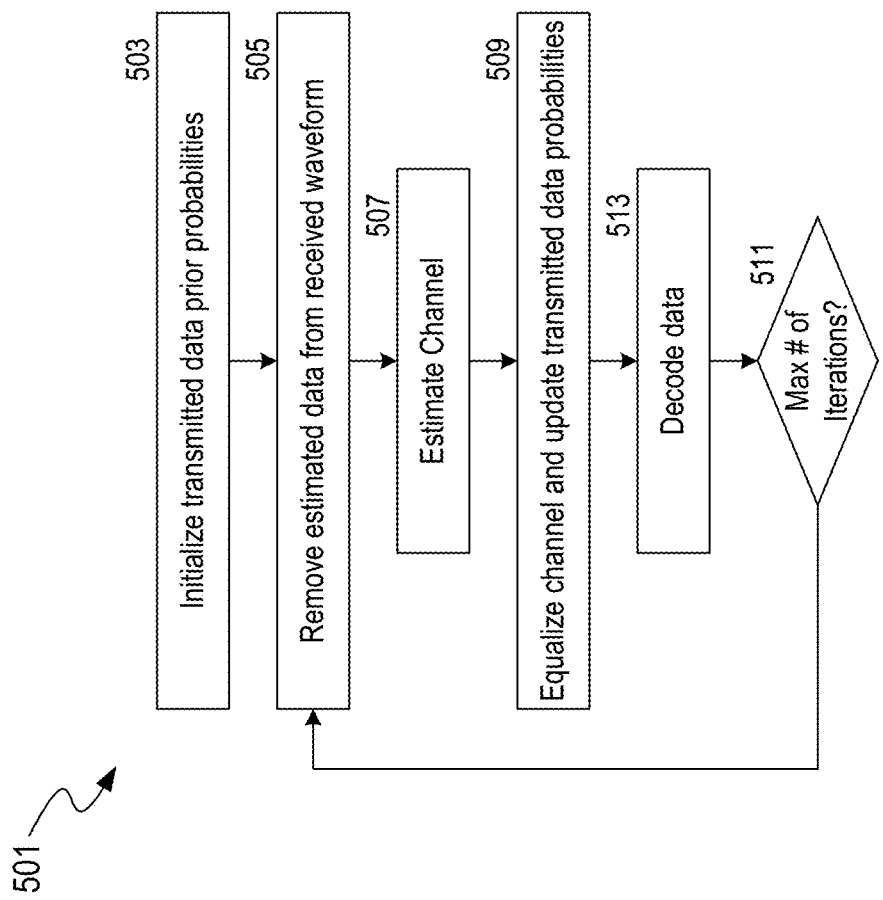
FIG. 5 is a flowchart depiction of an example of an iterative channel estimation and equalization method.

FIG. 5 is a flowchart depiction of an example method 501 of signal reception. The method 501 may be implemented by a receiver apparatus in a wireless communication system. For example, the receiver 102 may implement the method 501.

At 503, prior probabilities of the transmitted data are initialized. For example, the initialization operation may include accessing previously calculated probabilities stored in a local memory. These probabilities may have been computed in a previous iteration of method 501. At 505, estimated data may be subtracted, or removed, from the received waveform. At 507, channel estimation may be performed from the result of data subtraction. At 509, based on the results of channel estimate, the channel transfer function may be equalized and the transmitted data probabilities are updated (e.g., for subsequent use in a next iteration of operation 503).

At 513, data decoding is performed. The output of the data decoding may be used for deciding whether or not to perform additional iterations to improve the receiver operation. At 511, a check is made regarding a termination condition for the method 501. For example, a check may be made for whether a maximum number of iterations has been performed. Other possible conditions may include passage of an allotted amount of time or improvement in data estimates in successive iterations falling below an improvement threshold or being able to successfully decode and recover data in Step 513. As per the decision in 513, a next iteration of data estimation is performed starting at operation 505.

Figure 6:
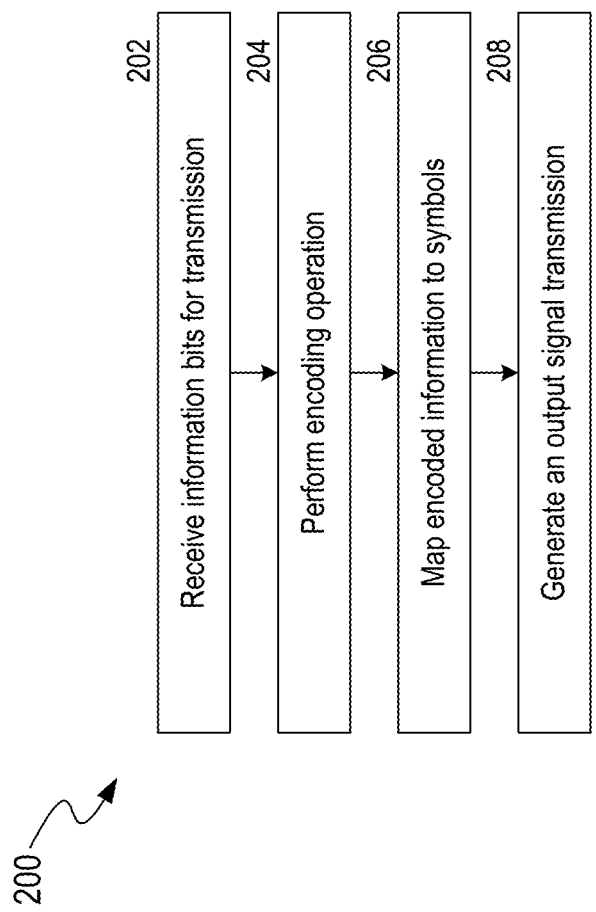
FIG. 6 shows a flowchart of an example wireless communication transmission method.

FIG. 6 is a flowchart of a method 200 implemented at a transmitter for generating and transmitting a reference signal and information bits by superimposing on top of each other.

The method 200 includes receiving (202) information bits for transmission. The information bits may form data symbols and may be generated by, e.g., user applications and thus be generally unknown a priori to the transmitter and the receiver.

The method 200 includes performing (204) encoding operation on the information bits to generate encoded information bits. Various encoding operations are known in the art to increase data protection, e.g., error correction coding. The encoding operation may also include bandwidth improving operations that reduce inter-data bit transitions (e.g., NRZ coding, differential coding, gray coding, etc.).

The method 200 includes mapping (206) the encoded information bits to symbols of a constellation to generate a sequence of symbols. Various symbol mapping techniques may be used to map to QAM or QPSK constellations. In general, the transmission system may map a vector of input data bits on to a SISO or an MIMO OFDM symbols.

The method 200 includes generating (208) an output signal for transmission by either (a) first superimposing a reference signal on the sequence of symbols to generate a composite signal and by modulating the composite signal into the output signal, or (b) first modulating the sequence of symbols to produce a modulated signal and by superimposing the reference signal over the modulated signal to generate the output signal. The superimposing the reference signal refrains from increasing transmission bandwidth required for transmission of the output signal. The resulting composite signal is the transmitted on a wireless channel.

Figure 7A:
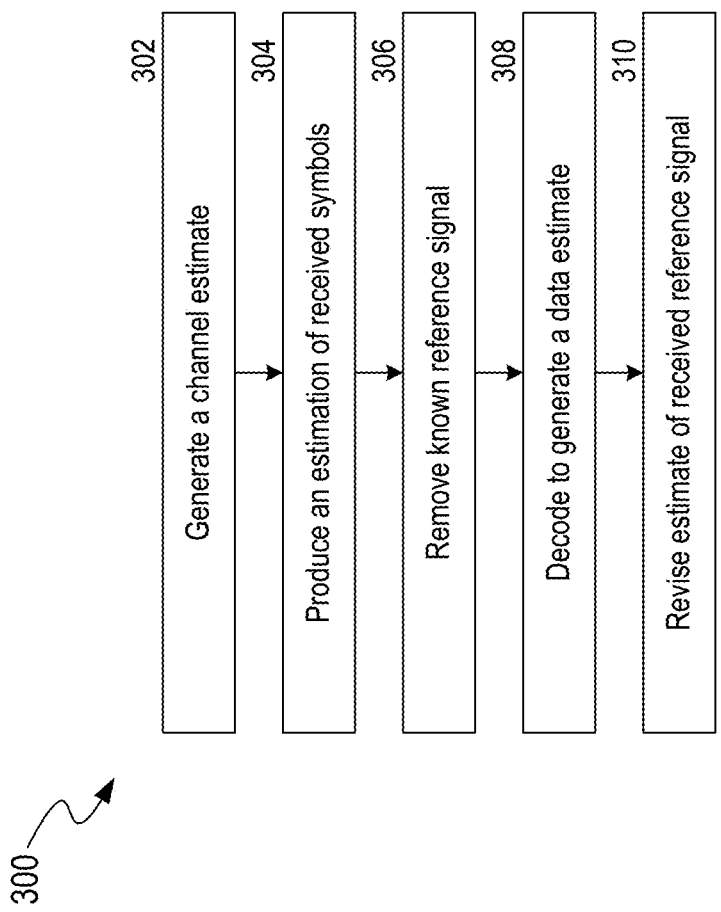
FIG. 7A shows a flowchart of another example wireless communication reception method.

FIG. 7A depicts a flow chart for a receiver-side method 300 of receiving signals.

The method 300 includes (A) generating (302) a channel estimate using the known reference signal and received demodulated signal. In some embodiments, reference signals may be sent only on a subset of all time-frequency locations. In such embodiments, the method 300 may include interpolating channel estimates at the locations of the reference signal to other time-frequency locations where reference signal is not present. In some embodiments, the channel estimates at these location may be improved by using feedback based on data estimates from previous iterations.

The method 300 includes (B) using the channel estimate to equalize the channel, thereby producing (304) an estimation of the received symbols, e.g., data symbols and the superimposed reference signal.

The method 300 includes (C) removing (306) the known reference signal from the estimation obtained in Step (B), (D) decoding data output after removing the known reference signal in Step (C) thereby generating estimation on the unknown data signal and extrinsic estimations on the encoded symbols.

The method 300 further includes (E) applying the channel estimate on the estimation of the unknown data signal and subtracting resulting signal from the received samples to generate a revised estimate of received reference signal (308).

The method 300 also includes (F) generating a new channel estimation using the revised estimate of the received reference signal (310).

The method 300 may iterate the previous steps until an exit criteria is met. The exit criteria may be, e.g., number of iterations performed, a time budget allocated for the iterative process, resources available for the computations, whether or not there is sufficient improvement over the previous iteration, etc. The exit criteria may also be error-free decoding of the unknown information signal.

Figure 7B:
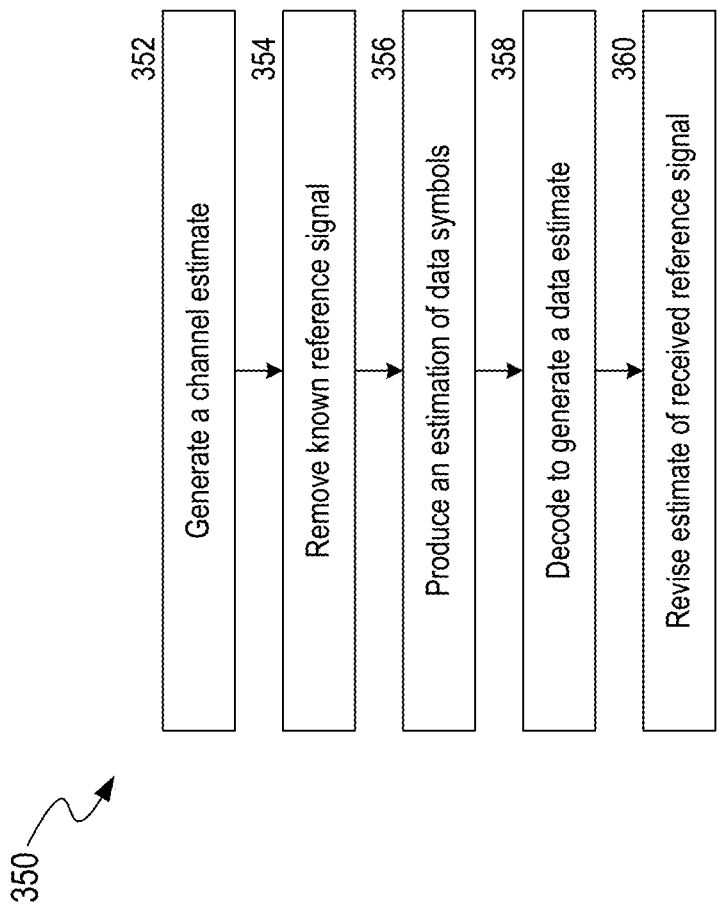
FIG. 7B shows a flowchart of another example wireless communication reception method.

In an alternate method 350 to method 300, as depicted in the flowchart of FIG. 7B, after channel estimation (352), the reference signal may be removed from the received signal (354) by applying the channel estimate to the reference signal and subtracting thus estimated contribution of the reference signal from the receiving signal. At this point, the subsequent channel equalization will thus provide estimation of the data symbol portion (356) of the received signal. This step may be followed by a decoding operation to generate data estimates (358) and the data estimates may be used to revise the estimate of the received reference signal (360). Such alternative processing flow may be obtained, e.g., by reversing order of Step (B) and Step (C) described with respect to method 300.

Alternatively, in methods 300 and 350, steps 310 and 360 could be modified to use the estimates of received data may be used in addition to or in lieu of the estimates of reference signals.

In some embodiments, a receiver-side method includes (A) generating a channel estimate using the known reference signal and received demodulated signal, (B) applying the channel estimate on the known reference signal and removing it from the received demodulated signal, (C) using the channel estimate to equalize the channel, thereby producing an estimation of the data symbols, (D) decoding data output thereby generating estimation on the unknown data signal and extrinsic estimations on the encoded symbols, (E) applying the channel estimate on the estimation of the unknown data signal and subtracting resulting signal from the received samples to generate a revised estimate of received reference signal, (F) generating a new channel estimation using the revised estimate of the received reference signal, and (G) iterating Step (B) to step (G) until an exit criteria is met.

Figure 8:
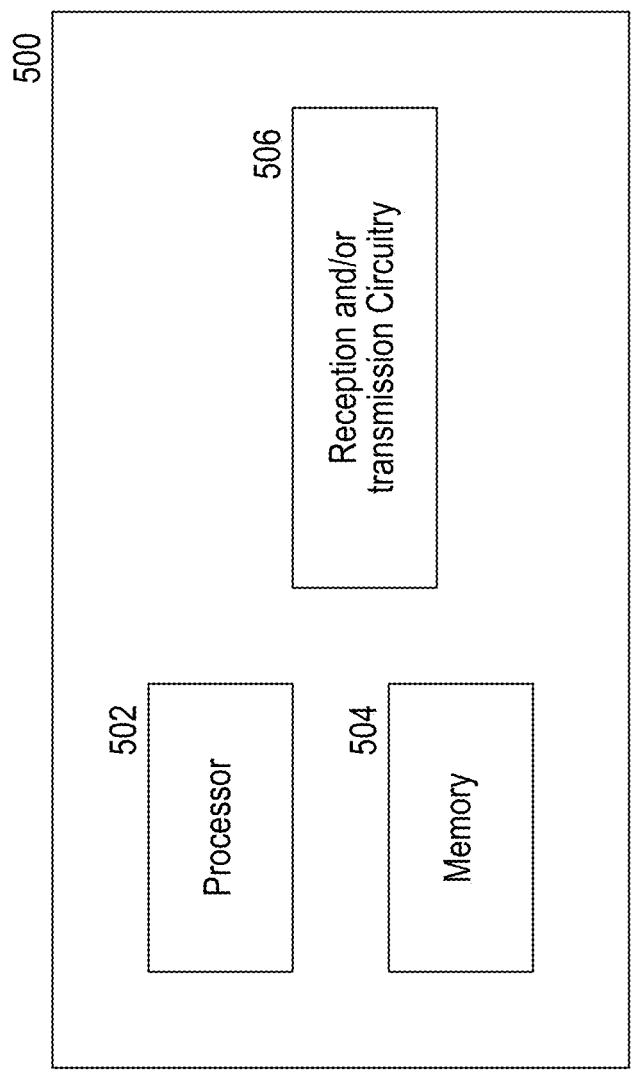
FIG. 8 shows an example of a wireless transceiver apparatus.

FIG. 8 shows an example of a wireless transceiver apparatus 500. The apparatus 500 may be used to implement method 200 or 300. The apparatus 500 includes a processor 502, a memory 504 that stores processor-executable instructions and data during computations performed by the processor. The apparatus 500 includes reception and/or transmission circuitry 506, e.g., including radio frequency operations for receiving or transmitting signals.

The methods described herein can be used in an OFDM (orthogonal frequency division multiplexing) or OTFS (orthogonal time frequency space modulation) system. The known reference signal can be added to the data symbols in the delay-Doppler plane (in OTFS) or in the time-frequency plane (in OFDM and OTFS). It may also be defined over the whole plane or part of it.

In some embodiments, the methods described herein may be embodied in the form of code and stored into memory of a wireless apparatus. The wireless apparatus may also include a processor that reads the instructions from the memory and implements the corresponding method.

It will be appreciated that techniques for wireless data reception are disclosed in which reference signal superimposed on top of data signal are transmitted and are received at a receiver. It will further be appreciated that, in one advantageous aspect, the disclosed technique reduces transmission resource overhead required for transmission of test signals, reference signals or pilots in a convention digital communication system.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A receiver-side apparatus for wireless communication, comprising:
   a reception circuitry configured to receive, over a channel, a signal comprising a known reference signal superimposed on an unknown data signal; and
   a processor, coupled to the reception circuitry, configured to:
   (A) generate a channel estimate using the known reference signal and by demodulating the signal;
   (B) use the channel estimate to equalize the channel, thereby producing an estimation of the data symbols and the superimposed reference signal;
   (C) remove the known reference signal from the estimation obtained in Step (B);
   (D) decode data output after removing the known reference signal in Step (C) thereby generating estimation of the unknown data signal and extrinsic estimations of encoded symbols in the signal;
   (E) apply the channel estimate to the estimation of the unknown data signal and subtracting resulting signal from the received signal to generate a revised estimate of the received reference signal;
   (F) generate a new channel estimation using the revised estimate of the received reference signal; and
   (G) iterate Step (B) to step (G) until an exit criteria is met.

2. The apparatus of claim 1, wherein the exit criteria comprises exceeding a number of iterations.

3. The apparatus of claim 1, wherein the exit criteria comprises achieving an error-free decoding of the unknown data signal.

4. The apparatus of claim 1, wherein in Step (A), the unknown data signal superimposed on the known reference signal are treated as noise.

5. The apparatus of claim 1, wherein, in Step (A), the processor is further configured, as part of generating the channel estimate, to:
   interpolate estimates at time-frequency locations where there is no known reference signal present.

6. The apparatus of claim 5, wherein the interpolating includes using feedback information from a prior iteration to estimate the channel at the time-frequency locations where there is no known reference signal present.

7. A receiver-side apparatus for wireless communication, comprising:
   a reception circuitry configured to receive, over a channel, a signal comprising a known reference signal superimposed on an unknown data signal; and
   a processor, coupled to the reception circuitry, configured to:
   (A) generate a channel estimate using the known reference signal and by demodulating the signal;
   (B) apply the channel estimate obtained in Step (A) to the known reference signal and subtracting the result from the received signal;
   (C) use the channel estimate to equalize the signal obtained in Step (B), thereby producing an estimation of the data symbols;
   (D) decode data output thereby generating estimation of the unknown data signal and extrinsic estimations of encoded symbols in the signal;
   (E) apply the channel estimate to the estimation of the unknown data signal and subtracting resulting signal from the received signal to generate a revised estimate of the received reference signal;
   (F) generate a new channel estimation using the revised estimate of the received reference signal; and
   (G) iterate Step (B) to step (G) until an exit criteria is met.

8. The apparatus of claim 7, wherein the exit criteria comprises exceeding a number of iterations.

9. The apparatus of claim 7, wherein the exit criteria comprises achieving an error-free decoding of the unknown data signal.

10. The apparatus of claim 7, wherein in Step (A), the unknown data signal superimposed on the known reference signal are treated as noise.

11. The apparatus of claim 7, wherein, in Step (A), the processor is further configured, as part of generating the channel estimate, to:
    interpolate estimates at time-frequency locations where there is no known reference signal present.

12. The apparatus of claim 11, wherein the interpolating includes using feedback information from a prior iteration to estimate the channel at the time-frequency locations where there is no known reference signal present.

13. A receiver-side apparatus for wireless communication, comprising:
    a reception circuitry configured to receive, over a channel, a signal comprising a known reference signal superimposed on an unknown data signal over a channel; and
    a processor, coupled to the reception circuitry, configured to:
    (A) generate a channel estimate using the known reference signal and by demodulating the signal;
    (B) use the channel estimate to equalize the channel, and subtracting the known reference signal therefrom;
    (C) produce an estimation of the data symbols from signal resulting from subtracting in in Step (B);
    (D) decode data output from the estimation of the data symbols obtained in step (C), thereby generating estimation on the unknown data signal and extrinsic estimations of encoded symbols in the signal;
    (E) apply the channel estimate on the estimation of the unknown data signal and subtracting resulting signal from the received samples to generate a revised estimate of the received reference signal;
    (F) generate a new channel estimation using the revised estimate of the received reference signal; and
    (G) iterate Step (B) to step (G) until an exit criteria is met.

14. The apparatus of claim 13, wherein the exit criteria comprises exceeding a number of iterations.

15. The apparatus of claim 13, wherein the exit criteria comprises achieving an error-free decoding of the unknown data signal.

16. The apparatus of claim 13, wherein in Step (A), the unknown data signal superimposed on the known reference signal are treated as noise.

17. A receiver-side apparatus for wireless communication, comprising:

a reception circuitry configured to receive, over a channel, a signal comprising a known reference signal superimposed on an unknown data signal; and a processor, coupled to the reception circuitry, configured to:

(A) generate a channel estimate using the known reference signal and by demodulating the signal;

(B) apply the channel estimate obtained in Step (A) to the known reference signal and subtracting the result from the received signal;

(C) use the channel estimate to equalize the signal obtained in Step (B), thereby producing an estimation of the data symbols;

(D) decode data output from the estimation of the data symbols obtained in step (C), thereby generating estimation on the unknown data signal and extrinsic estimations of encoded symbols in the signal;

(E) apply the channel estimate on the estimation of the unknown data signal and subtracting resulting signal from the received samples to generate a revised estimate of the received reference signal;

(F) generate a new channel estimation using the revised estimate of the received reference signal; and (G) iterate Step (B) to step (G) until an exit criteria is met.

18. The apparatus of claim 17, wherein the exit criteria comprises exceeding a number of iterations.

19. The apparatus of claim 17, wherein the exit criteria comprises achieving an error-free decoding of the unknown data signal.

20. The apparatus of claim 17, wherein in Step (A), the unknown data signal superimposed on the known reference signal are treated as noise.

* * * * *